Jan. 11, 1966 E. H. LAND 3,228,767
PHOTOGRAPHIC DIFFUSION TRANSFER PROCESS
Filed May 19, 1961
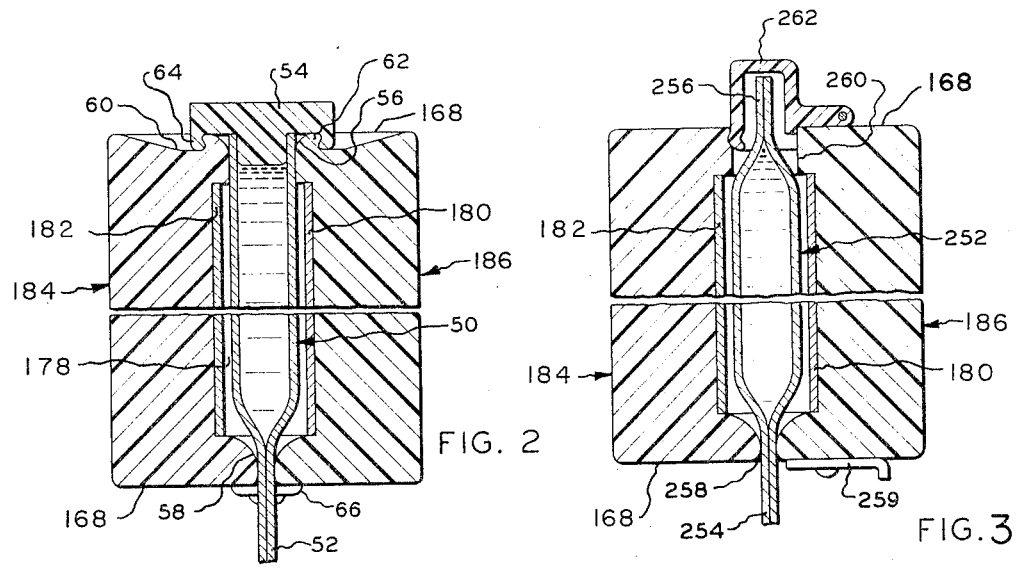
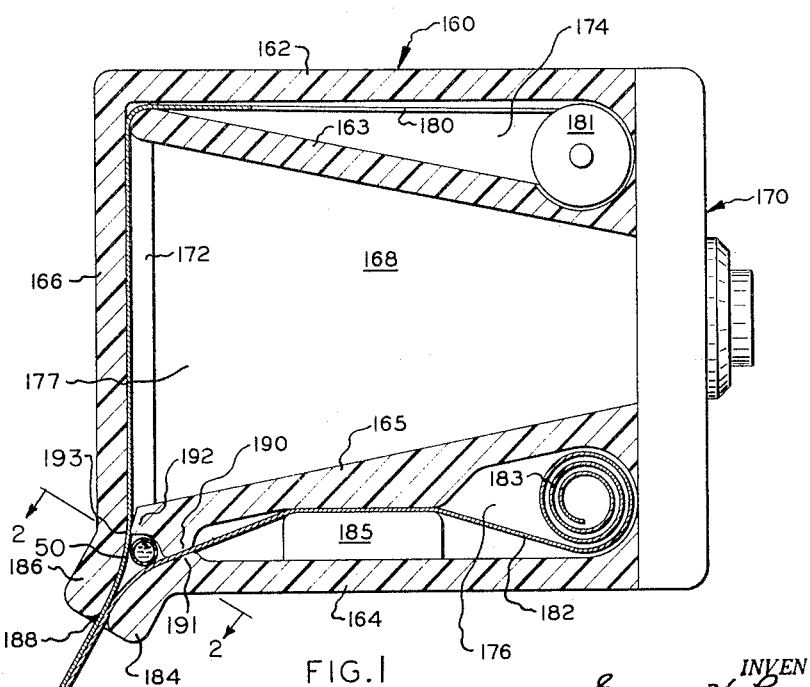
INVENTOR.
Edwin H. Land
BY Brown and Mikulka
and
Robert E. Corb
ATTORNEYS

United States Patent Office 3,228,767
Patented Jan. 11, 1966

3,228,767
PHOTOGRAPHIC DIFFUSION TRANSFER PROCESS
Edwin H. Land, Cambridge, Mass., assignor to Polaroid Corporation, Cambridge, Mass., a corporation of Delaware
Filed May 19, 1961, Ser. No. 111,268
9 Claims. (Cl. 96—29)

This application is a continuation-in-part of my U.S. application Serial No. 624,787, filed November 28, 1956, entitled "Photographic Process and Apparatus" and now abandoned.

This invention relates to photographic methods and more particularly to novel methods of exposing and processing photosensitive materials to produce high quality positive photographic images.

Conventional picture-taking practice involves the making of a "negative," i.e., a transparency (usually) in which the pattern of light and dark in the image is the inverse of that in the subject, by exposing a photosensitive material to light from the scene to be depicted and then treating (developing) the exposed photosensitive material to form a visible negative image. A positive is then made from the negative by a process involving exposure of another photosensitive material by light transmitted through the negative. The method of the invention differs from conventional picture-taking practice in that it involves the formation of a positive print directly from a photographically exposed negative by diffusion transfer-reversal effected by a fluid composition distributed on the exposed negative material.

In photography, "exposure" is generally defined as the total quantity of light incident upon a unit area of a photosensitive surface, and the most commonly employed unit of exposure is the "meter-candle-second" (m.c.s.). The "sensitivity" of a photosensitive material can be defined as an expression of the relationship between exposure and the result of exposure. Thus, in order to take a picture by conventional photographic methods, the sensitivity of the photosensitive material (negative) must be known, if it is to be exposed in such a way as to produce a particular result. The term "speed" is employed in photography as an expression of photographic sensitivity and is defined as "the reciprocal of the exposure required to produce a given result." Neblette, Photography, Its Material and Processes, The Van Nostrand Company, Inc., New York, fifth edition, 1952, page 264.

It is apparent from the foregoing that any precise definition or criterion of speed is based upon the selection of a particular result as a standard. A system of determining speed, in which the speed assigned a negative material is given in terms of the exposure required to give a negative print from which a positive print of specified quality can be produced, has been developed from the work of L. A. Jones et al. as reported in Mees, The Theory of the Photographic Process, The MacMillan Company, New York, 1944, chapter XIX, and L. P. Clerc, Photographic Theory and Practice, third edition, Pitman Publishing Corporation, New York, 1954, chapter XVIII. Based on this work, the American Standards Association, Inc., has established standards for rating photosensitive materials for speed. These standards specify techniques for plotting the density-log exposure curve of a negative material and deriving from the standard density-log exposure curve a speed which is specified as the reciprocal of the exposure corresponding to a predetermined point on the curve. The precise method for determining speed in this manner is described in detail in the publications of the American Standards Association, Inc., particularly in specification PH 2.5–1954, entitled "American Standard Method For Determining Photographic Speed and Exposure Index," and in a later specification, PH 2.5–1960, (a revision of PH 2.5–1954) entitled "American Standard Method for Determining Speed of Photographic Negative Materials (Monochrome, Continuous-tone)."

Speed, as determined by the ASA standard, is a numerical rating for photosensitive negative materials which may be used in conjunction with an exposure meter conforming to an ASA standard (e.g., PH 2.12–1957) to determine a camera exposure which will, on the average, produce a negative capable of yielding a print of good quality. The ASA speed rating determined by sensitometric criteria from a negative is to be distinguished from another speed rating which is termed the "equivalent overall speed" which results from a process for producing a positive print by diffusion transfer-reversal. In such a process, speed is based on a curve relating original exposure of the negative to density in the ultimate positive. It has been found experimentally that the "equivalent overall speed" or "effective speed" of a silver transfer-reversal process may be determined by plotting a characteristic curve of the reflection density of the positive as a function of log exposure of the negative, determining the exposure in meter-candle-seconds at the point on the curve corresponding to a density of 0.50 and dividing the constant 4.0 by the exposure so determined. The speed rating so obtained indicates generally the correct exposure rating of the silver transfer-reversal process to which an ASA calibrated exposure meter must be set in order that it give correct exposure data for producing pictures of satisfactory, high quality. The equivalence of the foregoing methods of determining rated ASA speed and equivalent overall speed can be readily established by obtaining a good silver transfer-reversal positive of a scene and determining from an ASA calibrated exposure meter the film speed that would be required to properly photograph this subject.

In the subsequent discussion, the term "ASA rated speed" shall mean the speed in reference to the negative as determined in accordance with the above-noted American Standards Association, Inc., specifications. The terms "equivalent overall speed" and "effective speed" shall mean, in reference to a silver transfer-reversal process (or the materials used therein), the speed as determined in the above-noted manner employing an ASA calibrated exposure meter. Both designations, in one sense, serve the same purpose. The ASA rated speed of the negative material is based upon the exposure to which the negative must be subjected in order to obtain a good photographic print of an average scene of normal brightness contrast by conventional processes; whereas the equivalent overall speed or effective speed is based upon the exposure to which the negative material for use in a silver transfer-reversal process must be subjected in order to obtain a positive of excellent quality by that process. Both, therefore, are direct guides to the settings which must be made in a camera in order to obtain proper exposure. Nevertheless, the two definitions of speed must be carefully distinguished from each other because, although ASA rated speed is related qualitatively to the production of a positive of high quality, it is a term which describes the character of a negative material. This negative material, nevertheless, may be employed in a silver transfer-reversal process according to the present invention to effect a speed, i.e., equivalent overall speed, which is vastly different from the ASA rated speed of the negative material; and for examples of such processes reference is made to my copending application Serial No. 564,492, filed February 9, 1956, and now abandoned, in which there is disclosed a novel silver transfer-reversal process in which a positive print of excellent quality is produced from a negative material subjected to exposures less and, in some cases, many times less than recommended by its ASA rated speed. Such an exposure provides a latent image having a density gradient confined to the low exposure or the toe region of the characteristic curve of the negative material.

In conventional photographic practice, the speed of the negative material is considered to be substantially fixed and the exposure is controlled so that the exposure is appropriate for the speed of the photosensitive material. The most common expedients employed to control exposure of the photosensitive material are regulating the illumination of the scene and regulating the light from the scene which is allowed to reach the photosensitive material, the latter being accomplished with the aid of a camera including an aperture for admitting light, means for determining the size of the aperture and means for determining the duration of exposure. It is quite common to find that the scene brightness cannot be varied to any extent so that with speed being fixed, control over exposure is limited substantially to determining exposure duration and/or relative aperture.

Objects of the invention are: to provide a novel method of picture taking in which high quality positive photographic prints are made directly from exposed negative photosensitive material by diffusion transfer-reversal and the speed of the photosensitive material is, in effect, controlled so as to be appropriate for the exposure; and to provide a method as described wherein the effective speed of the photosensitive material is adjusted to suit the brightness of the scene being photographed.

Various techniques have been employed in conventional photographic practice for deriving a useful negative image from a latent image resulting from an improper exposure of a negative material. By improper exposure is meant an exposure other than that recommended by the rated speed of the photosensitive material and which lies, at least partially, without the useful exposure scale of the photosensitive material. In the case of underexposure or threshold exposures, the techniques for producing a useful image include latensification, i.e., treatment after photoexposure to intensify the latent image; special or overdevelopment, i.e., development with powerful reducers that discriminate sharply between exposed and unexposed silver halide grains and/or for abnormally long periods; and intensification, i.e., treatment after photoexposure to increase contrast after development. All of these technique, however, have one common feature which distinguishes them over the method of the invention and this is the fact that each technique seeks to correct for an exposure which is incorrect; whereas the present invention represents the achievement of another significant objective, that is, a process which always results in a correct exposure and which does not seek to correct for an improper exposure. Since it is exposure which determines the relationship between the contrasts among the dark tones and the contrasts among the light tones, only a proper exposure can result in a high quality negative (or positive) in which there is a proportional relation between the densities in parts of the negative and the relative brightness of corresponding parts of the scene depicted. Treatment of the negative after exposure, particularly by special development, can only vary the contrast (density differences between the tones) but cannot produce proper gradation or the pictorial quality which results from correct exposure.

Other objects of the invention are: to provide a novel method of producing a plurality of useful positive photographic images employing negative materials having substantially the same ASA rated speed and wherein the exposures for producing said images are substantially different and the equivalent overall speed of the process for producing each print is the speed which recommends the exposure resulting in said each print; and to provide a method of photography which makes it possible to produce a plurality of high quality photographic prints depicting different scenes in a camera having means for making exposures of substantially fixed duration at a substantially fixed relative aperture and employing photosensitive materials having a single ASA rated speed.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic elevation view partially in section illustrating apparatus in the form of a camera for taking pictures in accordance with the method of the invention;

FIG. 2 is a sectional view taken along the line 2—2 of FIGURE 1; and

FIG. 3 is a view similar to FIG. 2 illustrating another embodiment of the camera and the materials employed in practicing the method of the invention.

The method of the invention comprises exposing a photosensitive sheet and thereafter treating the exposed photosensitive sheet with a fluid processing agent in conjunction with a second sheet to produce a positive photographic transfer print. The expression "second sheet" as used herein a intended to mean a second sheet which may merely cooperate with the photosensitive sheet to aid in the spreading of the processing fluid on the photosensitive sheet or which, in a preferred form, provides a support for a positive transfer print formed by diffusion transfer-reversal. The photosensitive sheet may comprise a support and a layer of any of the photographically useful light-sensitive heavy metal salts known to the art and, in the preferred form, comprises a gelatino silver halide emulsion. The composition of the fluid processing agent depends on the particular light-sensitive material which is employed and the type of processing intended and, in a preferred form wherein the photosensitive material is a silver halide emulsion, includes a silver halide developer and a silver halide solvent. The developer reduces the exposed silver halide to silver and the solvent reacts with unreduced silver halide to form a soluble silver complex which is reduced in the presence of a silver precipitating environment to form a positive print preferably on the second sheet. Further examples of processes of this type together with materials useful therein are described in Patent No. 2,543,181 issued February 27, 1951 to Edwin H. Land.

It is possible, employing the method of the invention, to take pictures under a wide range of conditions and of scenes of widely varying brightness with a camera which is both inexpensive and simple to operate. Such a camera, illustrated by way of example in the drawing, might include an exposure device which is both simple and inexpensive because it provides but a single speed (exposure duration) and a single or a limited number of exposure stops. Along with such a camera, the photographer would be provided with a single film or film having but a single ASA rated speed, an exposure computing device (exposure meter) and a supply of containers of processing fluid capable of giving equivalent overall speeds which recommend the exposures the photographer is likely to encounter. Picture taking according to this system would, in a sense, be just the reverse of the conventional system in that here the exposure is made, is measured at the time it is made and the film speed required is then calculated; whereas in conventional photographic practice the film speed is known and fixed, the exposure conditions are determined and then the exposure is made. In conventional photography the speed recommends the exposure whereas in the system of the invention exposure recommends the speed.

In my aforementioned copending application Serial No. 564,492, there is given, by way of example, formulations of processing solutions which, when used to process a silver halide emulsion, namely a gelatino iodobromide emulsion sold by Eastman Kodak under the name "Royal Pan," and having an ASA rated speed of approximately 370, gave rise to much higher equivalent overall speeds ranging from 900 to 2780 reciprocal meter-candle-seconds (m.c.s.). It has been found that by using a similar formulation with different amounts of sodium hydroxide and sodium thiosulfate, and different developers, a wide range of equivalent overall speeds may be obtained with a single emulsion. In this manner a range of speeds suitable for practical use in the process of the invention and differing from one another by a factor of two were obtained using an emulsion of the "Royal Pan" type on a paper support. The formulation of processing solutions was adjusted to produce equivalent overall speeds ranging from 25 to 1000 with each speed being, nominally, twice the previous speed, with the same emulsion.

Processing solutions were prepared in substantially the same manner as described in application Serial No. 564,492 and were spread in a thin layer, approximately three thousandths of an inch thick, between each emulsion and a silver-receptive stratum and the three strata were maintained in superposed relation for a processing period of approximately 60 seconds. The following non-limiting examples illustrate the range of equivalent overall speeds which may be achieved with various processing solutions and the same silver halide emulsion:

*Example I*

The formulation of a processing solution giving an equivalent overall speed of 25 reciprocal m.c.s. was as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 19.14 |
| Sodium thiosulfate _____g__ | 14.4 |
| Hydroquinone _____g__ | 14.25 |
| Metol _____g__ | 1.2 |
| Water _____cc__ | 265 |

*Example II*

The formulation of a processing solution giving an equivalent overall speed of 50 reciprocal m.c.s. was as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 19.14 |
| Sodium thiosulfate _____g__ | 14.4 |
| Hydroquinone _____g__ | 14.25 |
| Metol _____g__ | 2.4 |
| Water _____cc__ | 265 |

*Example III*

The formulation of a processing solution giving an equivalent overall speed of 130 reciprocal m.c.s. (nominally 100) is as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 10.14 |
| Sodium thiosulfate _____g__ | 14.4 |
| Hydroquinone _____g__ | 14.25 |
| Amidol _____g__ | 1.5 |
| Water _____cc__ | 265 |

*Example IV*

The formulation of a processing solution giving an equivalent overall speed of 220 reciprocal m.c.s. (nominally 200) was as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 10.14 |
| Sodium thiosulfate _____g__ | 3.6 |
| Hydroquinone _____g__ | 18 |
| Amidol _____g__ | .3 |
| Water _____cc__ | 265 |

*Example V*

The formulation of a processing solution giving an equivalent overall speed of 400 reciprocal m.c.s. was as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 10.14 |
| Sodium thiosulfate _____g__ | 39.6 |
| Amidol _____g__ | 4.2 |
| Water _____cc__ | 265 |

*Example VI*

The formulation of a processing solution giving an equivalent overall speed 800 reciprocal m.c.s. was as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 14.10 |
| Sodium thiosulfate _____g__ | 5.04 |
| Amidol _____g__ | 4.2 |
| Water _____cc__ | 265 |

*Example VII*

The formulation of a processing solution giving an equivalent overall speed of 1000 reciprocal m.c.s. was as follows:

| | |
|---|---|
| Sodium sulfite _____g__ | 17.10 |
| Sodium carboxymethyl cellulose (high viscosity) _____g__ | 9.51 |
| Sodium hydroxide _____g__ | 10.14 |
| Sodium thiosulfate _____g__ | 3.6 |
| Amidol _____g__ | 8.55 |
| Water _____cc__ | 265 |

As noted in application Serial No. 564,492, it is possible with processes of this type to achieve very fast equivalent overall speeds which may be as high, for example, as 1 to 50 times the ASA rated speed of the negative material employed. This is demonstrated by Examples IV through VIII of said application, wherein a negative material having an ASA rated speed of 100 was exposed and processed to produce, respectively, equivalent overall speeds of 2000, 2710, 1760, 900 and 1000 reciprocal m.c.s. With this in mind and when it is considered that, in this process, the negative material is intentionally subjected to what otherwise would be considered an underexposure, it will be readily appreciated that it is possible to provide very simple and inexpensive cameras including an exposure means comprising a pinhole aperture, instead of a lens and stop, and an inexpensive shutter, which is capable of producing high quality prints under most conditions with exposures of acceptably short duration, e.g., a fraction of a second. Variations in the overall speed of the process to suit different exposures will be achieved by providing a multiplicity of containers of fluid processing agents capable of producing a range of overall speeds suitable for predetermined exposures and selecting the proper fluid composition to be used according to the exposure.

Apparatus for practicing the method of the invention is shown for purposes of illustration in the form of a camera, a construction for which it is particularly suited, arranged for exposing a frame of a photosensitive sheet and processing the exposed frame by superposing it with a second sheet and spreading a fluid composition in a layer between the sheets. The apparatus includes a housing providing a first chamber wherein a frame of the photosensitive sheet is positioned for exposure, a second chamber wherein the second sheet is positioned during exposure of the photosensitive sheet, and at least a third chamber which is isolated in a lighttight fashion from at least the first chamber. Means, in the form of a pair of pressure-applying members, are provided at one side of this third chamber for superposing the sheets and spreading a fluid composition therebetween as the sheets are withdrawn from the third chamber between the pressure-applying members.

The third chamber is so constructed and arranged that portions of the photosensitive and second sheets may be located therein with a fluid-receiving space between the sheets. Also associated with the third chamber are means whereby an elongated container, filled with a fluid processing composition, may be introduced into the camera into a fluid-receiving space between the sheets and then withdrawn in the direction of its elongation transversely of the sheets while the container is progressively compressed to effect the discharge of its fluid contents into the fluid-receiving space. The third chamber, being isolated from the first chamber, permits the introduction of a container into the fluid-receiving space between the sheets without exposing the exposure frame of the photosensitive sheet located in the first chamber. The construction of the third chamber is such that it may be sealed against the admission of light following withdrawal of the container, permitting the photosensitive and second sheets to be moved through the container between the pressure-applying members in a lighttight environment.

Only a portion of the photosensitive sheet located adjacent the exposure frame is positioned within the third chamber during introduction and withdrawal of a container and is subjected to exposure to light which may enter the chamber. The third chamber may also be isolated from the second chamber as well, although this is unnecessary since the second sheet is not sensitive to light and the second chamber for storing the second sheet is light-sealed from the first chamber. Also, it is possible to eliminate the second chamber entirely and store the second sheet in what is defined as the third chamber.

Cameras for practicing the present invention may take a number of different forms for use with a variety of different types of photosensitive and second sheets and include cameras for use with photosensitive and second sheets in roll form with the photosensitive sheet comprising a series of exposure frames; photosensitive and second sheets in cut form, that is, as individual sheets with each photosensitive sheet including a single exposure frame and with the sheets either separate from one another or connected by leaders; and for use with a single exposure film assemblage comprising a photosensitive sheet and a second sheet secured together and adapted to be introduced into and withdrawn from the camera. The camera may be of the folding type, so-called box type or miniature type, and may be intended for use with photographic sheet materials having light-transmitting supports or backings or opaque backings. The present invention is also adapted to incorporation into the structure of film magazines or holders of either the cut or roll film type adapted to be associated with another means for making an exposure or may be incorporated into apparatus such as an X-ray cassette wherein the photosensitive material is exposed to penetrative radiation. For a more complete showing of such apparatus, reference may be had to the aforementioned application of which this application is a continuation-in-part.

Reference is now made to FIGS. 1 and 2 of the drawings wherein there is shown apparatus embodying the invention in the form of a box camera 160. Camera 160 comprises a housing including an upper wall 162, lower wall 164, rear wall 166, side walls 168 and exposure means in the form of a conventional lens and shutter assemblage 170 mounted on the forward portions of the upper, lower and side walls. The camera includes at least a pair of intermediate walls 163 and 165 which converge toward one another at the front of the camera and provide a light path between the lens and a photosensitive frame positioned for exposure at the rear of walls 163 and 165 adjacent rear wall 166. A pair of guide tracks 172 may be provided on side walls 168 between upper and lower intermediate walls 163 and 165 for locating a frame of a photosensitive sheet for exposure. Intermediate walls 163 and 165 cooperate with rear wall 166 to define an exposure chamber 177 while upper intermediate wall 163 defines, in conjunction with upper wall 162, a first or upper storage chamber 174 for a supply of a photosensitive sheet material, designated 180, and lower intermediate wall 165 defines, in conujnction with lower wall 164, a second or lower storage chamber 176 for a supply of a second sheet, designated 182. A supply of photosensitive sheet 180 may be provided coiled around means such as a conventional spool 181 mounted in chamber 174, while second sheet 182 may be supplied either on a spool or as a loose roll 183 since the second sheet is not photosensitive.

Lower wall 164 and rear wall 166 are provided, respectively, with downwardly and rearwardly extending portions 184 and 186 which comprise a pair of pressure-applying members cooperating with each other to define a pressure-generating gap 188 through which the superposed photosensitive sheets are movable for spreading a fluid composition in a layer therebetween. Gap 188 between pressure-applying portions 184 and 186 is of a substantially predetermined width greater than the combined thickness of sheets 180 and 182 whereby a fluid composition provided between the sheets is caused to be spread in a layer as the sheets are withdrawn from the camera through the gap. Pressure-applying portions 184 and 186 are shown as being somewhat enlarged so as to strengthen and add rigidity to the structure so that the width of the gap will remain substantially constant during spreading of the fluid, and may also be provided with suitable strengthening means for this purpose. As an alternate construction the pressure-applying means may comprise some type of device, for example, a metal plate having a slot therethrough secured to portions 184 and 186 with the slot located in the position of gap 188 and serving the same purpose.

The structure of the camera as shown and described is such as to lend itself to formation from plastic material, for example, by molding, with the result that the camera can be produced simply and inexpensively. The aforementioned strengthening means for the pressure-applying portions of the camera may take the form, for example, of rigid metal bars extending through the plastic material comprising portions 184 and 186 on opposite sides of the gap 188 and may, for example, be molded into the plastic material. Lower intermediate wall 165 is provided with a pair of extended sections 190 and 192 which extend, respectively, to locations closely adjacent lower wall 164 and rear wall 166 and provide, in conjunction with said walls, narrow passages 191 and 193 through which the second and photosensitive sheets are movable respectively. At least passage 91 is sealed against the admission of light and pressure-applying portions 184 and 186 cooperate with one another, with extended sections 190 and 192 and with side walls 168 to form a fourth or processing chamber 178, isolated from exposure chamber 177, into which a container of processing fluid may be introduced between portions of the photosensitive and second sheets extending through passages 191 and 193 into superposition with one another within gap 188.

The fluid processing composition to be spread between the sheets is provided in an elongated tubular container, designated 50, of the type described in detail in my copending application Serial No. 522,605, filed July 18, 1955, (now abandoned and replaced by Serial No. 820,266, filed June 15, 1959 and now U.S. Patent 3,047,387). Container 50 may be cylindrical, as shown, or oblate in cross section, and is formed of sheet material which is sufficiently rigid to resist deformation due to hydraulic pressure in its fluid contents, yet is flexible enough so that the container can be compressed or flattened by movement between a pair of pressure-applying members. The container is substantially longer than the transverse dimension of the sheets to be processed and includes a liquid-carrying cavity substantially equal in length to the width of the exposure frame. Both ends of the fluid-filled container are sealed closed with at least one of the ends being sealed so that it will open, for example, in response to hydraulic pressure generated in the fluid contents of the container. In the form shown in FIG. 2, the leading end of the container, designated 52, is sealed by compressing the wall of the container and securing or bonding the inner faces thereof to one another. A plug 54 having recessed flanges 64 is provided in the opposite or trailing end of the container for closing said end.

Container 50 is adapted to be introduced between the portions of sheets 180 and 182 located within third chamber 178 in a position transversely of the sheets. For this purpose the end walls of chamber 178, e.g., side walls 168, are provided with openings, designated 56 and 58, located opposite one another in the end of the chamber. Opening 56 is shaped to conform substantially to the shape of the container and plug so that the container may be introduced into chamber 178 therethrough. Opening 58 at the opposite end of chamber 178 is in the form of a narrow slot having dimensions just sufficient to admit the container in a flattened condition whereby the sides of the opening will engage the container and function as pressure-applying members for progressively compressing the container as it is withdrawn, in the direction of its leading end, through opening 58. The container is adapted to be introduced into chamber 178 between the sheets until the container is located, as shown in FIG. 2, with the leading end portion extending through opening 58 exteriorly of the camera, where it provides a leader by which the container may be grasped for withdrawing the container through the opening. A recess 60 is provided in the wall surrounding opening 56 together with a projecting lip 62 immediately surrounding the opening. Flange 64 of plug 54 is so formed as to extend around and engage lip 62 when the container is in the position shown, whereby a lighttight seal is formed between the plug and the end wall of chamber 178, and the plug is retained in covering relation to opening 56 when the container is withdrawn from the chamber through opening 58.

As the container is withdrawn from between the portions of sheets 180 and 182 located within chamber 178, its trailing end is withdrawn from engagement with plug 54, thereby providing an open mouth through which the fluid contents of the container are discharged in the form of an elongated mass across the sheets as portions of the container succeeding from the leading end are compressed by the walls of opening 58. Generally the fluid should be quite viscous so that it can be readily controlled after being discharged, i.e., so that it will not flow freely of its own accord from the elongated mass which it first assumes when it is discharged from the container. It has been found that a fluid should have a viscosity ranging between 100 and 200,000 centipoises at a temperature of 20° C. if the fluid is to be spread readily from the elongated mass between the sheets.

Light-sealing means, for example, in the form of a sliding member 66 mounted on one of side walls 168 is provided for closing opening 58 following withdrawal of a container therefrom. Opening 56, as previously noted, is closed by plug 54 so that the only opening into chamber 178 from the exterior of the camera is gap 188 through which sheets 180 and 182 project and are adapted to be withdrawn. In an alternative form of the camera, suitable pressure-applying means may be provided in association with opening 58 for compressing the wall of the container as it is withdrawn from chamber 178 and this pressure-applying means may also act as a light-sealing element for closing the opening after the container has been withdrawn.

As the sheets are withdrawn through gap 188 from chamber 178, hydraulic pressure is generated within the fluid between the sheets, causing the fluid to be spread in a thin layer therebetween. Pressure-applying portions 184 and 186, of course, engage the surace of the sheets very closely so that substantially no light can enter chamber 178 and thereby expose other portions of the photosensitive sheet as they are drawn through the chamber. The layer of processing fluid, being quite viscous, causes the two sheets to remain adhered to one another as they are drawn from the camera, the sheets being opaque in order to prevent exposure of the frame of the photosensitive sheet. To insure that light does not enter between the superposed sheets, a material, such as a light-opaque or light-absorbing pigment, may be provided in the processing fluid. At the end of a predetermined processing period, the photosensitive and second sheets may be stripped apart.

Since the photosensitive sheet includes a plurality of exposure frames, indexing means 185 are preferably provided for arresting the movement of the sheets each time an exposure frame of photosensitive sheet 180 is in position for exposure. Indexing means, responsive to engagement with a portion of sheet 182 and suitable for incorporation into either chamber 174 or chamber 176 and adapted to engage portions of either of the sheets for arresting their movement, are well known in the art, the specific type of indexing mechanism employed being immaterial. It is desirable to sever each sandwich containing a processing exposure frame from the remainder of the sheets as the sandwich is withdrawn from the camera through gap 188 and, accordingly, suitable sheet-severing means may be provided for containing the sheets so as to leave a leader extending from gap 188 which may be employed for withdrawing the sheets from the camera. Alternatively, the sheets may be precut or perforated so that they will tear readily along predetermined lines exterior of the camera to provide a leader when movement of the sheets through the gap is arrested by the indexing mechanism.

In another form, the container may be sealed at both ends in the same manner, that is, by compressing the walls together and either adhering them in this position or holding them together by suitable retaining means. This type of container, designated 252, is shown in FIG. 3 of the drawing and comprises, respectively, leading and trailing ends 254 and 256 both formed by sealing or adhering the walls together, for example, by fusion of the material comprising the inner surfaces of the walls. To adapt it to use with container 252, the camera includes a slot 258 in one end of the processing chamber through which the container is withdrawn, slot 258 being substantially the same as the above described opening 58 for compressing the container as it is moved through the slot and a suitable closure 259, similar to closure member 66, is provided for closing the slot. An opening 260 is provided in the opposite end of the processing chamber whereby the container may be introduced into the chamber between the sheets and a pivotable cap 262 is provided for closing opening 260 against the admission of light into the processing chamber.

The structure of each of containers 50 and 252 and the camera are such that the container is introduced into the third chamber through an opening in one end and is withdrawn in the same direction through an opening in the opposite end of the chamber. However, in another form of the invention (not shown), the third chamber is provided with a single opening through which the container is both introduced and withdrawn. A container of the type adapted to be employed in this manner is closed at both ends by compressing its walls and bonding the inner surfaces thereof together. The leading end of the container, that is, the end which is introduced first and withdrawn last, is sealed in such a manner that it will become unsealed in response to hydraulic pressure generated within the fluid contents of the container to provide an open mouth through which the fluid contents of the container are discharged. An opening is provided in one of the walls defining an end of the processing chamber through which the container is adapted to be introduced and moved into position with the leading end of the container located in a recess provided in the opposite end wall of the processing chamber. The recess is provided so that the fluid-filled cavity of the container will extend to substantially the edges of the sheets between which it is located. The trailing end of the container is substantially longer than the leading end and extends through the opening to provide a leader by which the container may be grasped for withdrawing it from the chamber. A manually operable device is provided in association with the opening for applying compressive pressure to the container as it is withdrawn through the opening and for closing the opening against the admission of actinic light after the container has been withdrawn.

Heretofore the suggested practice for causing the fluid contents of the container to be ejected between the sheets has involved the compression of the container progressively as it is withdrawn from between the sheets. Other methods of ejecting the fluid contents of the container are possible and may be employed in the present invention. For example, a piston type element or closure may be provided in the container and is held stationary with respect to the sheets as the container is withdrawn from between the sheets whereby the piston moves in and with respect to the container, causing its fluid contents to be ejected. Containers, devices and processes of this type, suitable for incorporation into and use with the present apparatus and processes, are more fully shown and described in application Serial No. 553,287, filed December 15, 1955 and now U.S. Patent 3,037,670 in the name of Irving Erlichman. Additional devices, useful for causing the ejection of the fluid contents of containers of the type shown during withdrawal from between the sheets and adapted to be associated with the herein disclosed apparatus, are described in the aforementioned patent applications, Serial Nos. 553,287 and 522,605 and in applications Serial Nos. 538,152, (now Patent No. 2,833,192) filed in the name of Edwin H. Land and 538,048, (now Patent No. 2,834,272) filed in the name of Irving Erlichman, both on October 3, 1955.

Best results are assured when the exposure, which recommends the processing composition to be used, is determined exactly and this can be best accomplished at the instant of exposure. This may be readily accomplished, for example, by incorporating an exposure meter in the structure of the camera and coupling the exposure meter with the shutter, so that the indicating means of the meter is automatically fixed in position at the instant exposure is made. By fixing the indicating means of the exposure meter at the instant exposure is made, the operator may be certain of the precise conditions of exposure, i.e., scene brightness. This constitutes a further advantage over conventional photographic methods wherein the exposure conditions specifically scan brightness, are measured with the aid of a meter and then the diaphragm stop and shutter speed are set prior to making the actual exposure, since scene brightness and hence the recommended exposure may vary during the interval. With the construction of the invention, the operator may read the meter to determine the exposure and select the proper processing material at any time following exposure and be assured that the conditions indicated by the meter were those under which the exposure was made. The meter may, in fact, be calibrated to designate, directly, the container carrying the proper processing fluid which is appropriate for the exposure rather than light values, as is customary with most meters.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. A method of producing high quality positive photographic prints utilizing a photographic image-recording sheet material containing a photosensitive silver halide and having substantially the same characteristics for each of said prints, comprising:

for each of said prints, subjecting a single area of said image-recording sheet material to a single exposure at an aperture and for a duration determined prior to measurement of the subject brightness to produce a latent image of said subject in said area of said sheet material;

providing a plurality of containers of different liquid processing agents, each of said containers containing an amount of said liquid processing agent sufficient to process substantially only one of said areas and capable, when permeated into said image-recording sheet material, of producing a silver transfer print having a full, photographically useful exposure range in an image-receiving layer superposed with said image-recording layer by a silver halide diffusion-transfer reversal process imparting an equivalent overall speed to said image-recording sheet material appropriate for a predetermined exposure;

said processing agents provided being capable of imparting to said image-recording sheet material a plurality of predetermined equivalent overall speeds appropriate for exposures differing by predetermined amounts;

at the time of exposure of said image-recording sheet material, measuring the brightness of said subject by means indicating which of said containers contains said processing agent capable of imparting an equivalent overall speed appropriate for said exposure;

dispensing said processing agent from said container indicated by the last-mentioned means and distributing said processing agent in contact with said area of said exposed image-recording sheet material for permeation thereto to effect the treatment thereof; and by said processing agent forming a positive diffusion-transfer print in an image-receiving layer superposed with said image-recording sheet material.

2. The method of claim 1 wherein each of said areas of said image-recording sheet material is a separate element.

3. A method of producing high quality positive photographic prints utilizing a photographic image recording sheet material containing a photosensitive silver halide and having substantially the same characteristics for each of said prints, comprising:

for each of said prints, subjecting a single area of said image-recording sheet material containing a photosensitive silver halide to a single exposure at an aperture and for a duration determined prior to measurement of the subject brightness to produce a latent image of said subject in said sheet material;

providing a plurality of containers of different liquid processing agents, each of said containers containing an amount of said liquid processing agent sufficient to process substantially only one of said areas and capable, when permeated into said image-recording sheet material, of producing a silver transfer print having a full, photographically useful exposure range in an image-receiving layer superposed with said image-recording layer by a silver halide diffusion-transfer reversal process imparting an equivalent overall speed to said image-recording sheet material appropriate for a predetermined exposure;

said processing agents provided being capable of imparting to said image-recording sheet material a plurality of predetermined equivalent overall speeds appropriate for exposures differing by predetermined amounts and covering a range of at least three stops;

at the time of exposure of said image-recording layer, measuring the brightness of said subject by means indicating which of said containers contains said processing agent capable of imparting an equivalent overall speed most appropriate for said exposure;

dispensing said processing agent from said container indicated by the last-mentioned means and distributing said processing agent in contact with said area of said exposed image-recording sheet material for permeation thereinto to effect the treatment thereof; and by said processing agent forming a positive diffusion-transfer print in an image-receiving layer superposed with said image-recording sheet material.

4. A method of producing high quality positive photographic prints under varying conditions of subject brightness utilizing a photographic image-recording sheet material containing a photosensitive silver halide and having substantially the same characteristics for each of said prints, said method comprising:

for each of said prints, subjecting a single area of said image-recording sheet material to a single exposure in a hand-held camera at an aperture and for a duration deermined prior to measurement of the brightness of the subject to produce a latent image of the subject in said area of said sheet material;

providing a plurality of containers of different liquid processing agents, each of said containers containing an amount of said liquid processing agent sufficient to process substantially only one of said areas and capable, when permeated into said image-recording sheet material, of producing a silver transfer print having a full and photographically useful exposure range in an image-receiving layer superposed with said image-recording sheet material by a silver halide diffusion-transfer reversal process imparting an equivalent overall speed to said image-recording sheet material appropriate for a predetermined exposure;

said processing agents provided being capable of imparting to said image-recording sheet material a plurality of predetermined equivalent overall speeds appropriate for exposure differing by predetermined amounts and extending over a predetermined range of subject brightness conditions;

at the time of exposure of said image-recording layer, measuring the brightness of said subject by means indicating which of said containers contains said processing agent capable of imparting an equivalent overall speed appropriate for said exposure; and dispensing said processing agent from said container indicated by the last-mentioned means and distributing said processing agent in contact with said exposed area of image-recording sheet material for permeation thereinto to effect the treatment within said camera of said image-recording sheet material; and by said processing agent, forming a positive transfer print in an image-receiving layer superposed with said image-recording sheet material.

5. The method of claim 4 in which said predetermined range is the equivalent of substantially three stops.

6. A method of producing high quality, positive photographic prints of subjects the brightness of which are subject to variation within a predetermined range by exposures of substantially the same predetermined duration and at substantially the same predetermined relative aperture, said method comprising:

for each of said prints, subjecting a single area of a photographic image-recording sheet material containing a photosensitive silver halide having substantially the same characteristics to a single exposure for a time and at an aperture determined prior to measurement of the brightness of the subject to produce a latent image of said subject in said area of said sheet material;

providing a plurality of containers of different liquid-processing agents each of said containers containing an amount of said liquid processing agent sufficient to process substantially only one of said areas and capable, when permeated into said area of said image-recording sheet material, of producing a silver transfer print having a full and photographically useful range in an image-receiving layer superposed with said area of said image-recording sheet material by a silver halide diffusion-transfer reversal process imparting an equivalent overall speed to said area of said image-recording sheet material appropriate for a predetermined exposure;

said processing agents provided being capable of imparting to said image-recording sheet material a plurality of predetermined equivalent overall speeds appropriate for exposures differing by predetermined amounts and extending over said predetermined range of scene brightness conditions;

at the time of exposure of said image-recording layer, measuring the brightness of said subject by means indicating which of said containers contains said processing agent capable of imparting an equivalent overall speed appropriate for said exposure;

distributing said processing agent from said container indicated by the last-mentioned means in contact with said exposed area of said image-recording sheet material for permeation thereinto to effect the treatment thereof; and by said processing agent forming a positive transfer print in an image-receiving layer superposed with said area of said image-recording sheet material.

7. The method of claim 6 in which said predetermined range of scene brightness conditions is equivalent to approximately three stops.

8. A method of producing high quality, positive photographic prints of subjects the brightness of which are subject to variation within the range ordinarily encountered in photographic practice, by exposure of substantially the same predetermined duration and at substantially the same predetermined aperture, said method comprising:

for each of said prints, subjecting a single area of a photographic image-recording sheet material containing a photosensitive silver halide having substantially the same characteristics to a single differential exposure of a duration and at an aperture determined prior to measurement of the brightness of the subject to produce a latent image of said subject in said sheet material;

providing a plurality of containers of different liquid processing agents, each of said containers containing an amount of said liquid processing agent sufficient to process substantially only one of said areas and capable, when permeated into said image-recording sheet material, of producing a silver transfer print having a full and photographically useful exposure range in an image-receiving layer superposed with said image-recording sheet material by a silver halide diffusion-transfer reversal process imparting an equivalent overall speed to said image-recording sheet material appropriate for a predetermined exposure;

said containers being provided with processing agents capable of imparting to said image-recording sheet material a plurality of predetermined equivalent overall speeds appropriate for exposures differing by predetermined amounts and extending over a range of scene brightness conditions equivalent to approximately 7 stops;

at the time of exposure of said area of said image-recording sheet material, measuring the brightness of the subject by means indicating which of said containers contains said processing agent capable of imparting an equivalent overall speed appropriate for said exposure;

distributing said processing agent from said container indicated by the last-mentioned means in contact with said exposed image-recording sheet material for permeation thereinto to effect the treatment thereof; and by said processing agent forming a positive transfer print in an image-receiving layer superposed with said image-recording sheet material.

9. A method of producing a plurality of high quality positive photographic prints of subjects the brightness of which are subject to variation within the range ordinarily encountered in photographic practice, by exposures of substantially the same predetermined duration and at substantially the same pedetermined aperture, said method comprising:

for each of said prints, subjecting a single area of a photographic image-recording sheet material containing a photosensitive silver halide having substantially the same characteristics, in a handheld camera, to a single differential exposure of a duration and at an aperture determined prior to measurement of the brightness of the subject to produce a latent image of said subject in said layer;

providing a plurality of containers of different liquid processing agents each of said containers containing an amount of said processing agent sufficient to process substantially only one of said areas and capable, when permeated into said image-recording sheet material, of producing a silver transfer print having a full and photographically useful exposure range in an image-receiving layer superposed with said image-recording sheet material by a silver halide diffusion-transfer reversal process imparting an equivalent overall speed to said image-recording sheet material appropriate for a predetermined exposure;

said containers being provided with processing agents capable of imparting to said image-recording sheet material a plurality of predetermined equivalent overall speeds appropriate for exposures differing by predetermined amounts and extending over a range of scene brightness conditions equivalent to approximately 7 stops;

at the time of exposure of said image-recording layer, measuring the brightness of the subject by means indicating which of said containers contains said processing agent capable of imparting an equivalent overall speed appropriate for said exposure;

superposing an image-receiving sheet with said exposed area of said image-recording sheet material within said camera;

introducing the container indicated by the last-mentioned means into said camera;

dispensing said processing agent from said indicated container;

distributing said processing agent between said area and said image-receiving sheet in contact therewith for permeation into said image-recording sheet material to effect the treatment thereof; and by said processing agent forming a positive transfer print in an image-receiving layer superposed with said image-recording sheet material.

References Cited by the Examiner

UNITED STATES PATENTS

| 2,647,056 | 7/1953 | Land | 96—29 |
| 2,653,627 | 9/1953 | Land | 96—29 |
| 2,692,830 | 10/1954 | Land | 96—29 |
| 2,774,667 | 12/1956 | Land | 96—29 |
| 2,834,272 | 5/1958 | Erlichman | 96—76 X |

OTHER REFERENCES

Cassidy: British Journal of Photography, 83, No. 3978, July 31, 1936, pages 490–491.

Focal Encyclopedia of Photography, Focal Press (1956), pp. 315–325.

Mees: The Theory of the Photographic Process, MacMillan, 1954, pp. 668–670, and 1038–39.

The Photographic Journal, vol. 90A, Jan. 1950, pp. 7–15.

U.S. Camera, July 1949, pp. 58 and 59.

NORMAN G. TORCHIN, *Primary Examiner.*

HAROLD N. BURSTEIN, *Examiner.*